United States Patent

Wakata

[11] Patent Number: 5,580,258
[45] Date of Patent: Dec. 3, 1996

[54] VEHICLE CHARGING CONNECTOR AND A RECEPTACLE ENCLOSING THE CONNECTOR

[75] Inventor: Shigekazu Wakata, Yokkaichi, Japan

[73] Assignee: Sumitomo Wiring Systems, Ltd., Yokkaichi, Japan

[21] Appl. No.: 258,830

[22] Filed: Jun. 13, 1994

[30] Foreign Application Priority Data

Jun. 14, 1993 [JP] Japan ...................................... 5-168435

[51] Int. Cl.$^6$ ...................................................... H01R 13/447
[52] U.S. Cl. ............................................ 439/142; 220/259
[58] Field of Search ........................ 439/34, 142; 220/241, 220/245, 253–259

[56] References Cited

U.S. PATENT DOCUMENTS

| | | | |
|---|---|---|---|
| 1,050,265 | 1/1913 | Crone | 220/259 |
| 2,054,145 | 9/1936 | Tandy | 220/259 |
| 2,132,432 | 10/1938 | Offutt | 220/259 |
| 2,761,552 | 9/1956 | Levine | 220/259 |
| 4,098,427 | 7/1978 | Duckworth, Jr. | 220/259 |
| 4,312,649 | 1/1982 | Fujii et al. | 220/DIG. 33 |
| 4,690,296 | 9/1987 | Elliott | 220/259 |
| 4,811,984 | 3/1989 | Hempel | 296/97.22 |
| 4,952,160 | 8/1990 | Olsen | 439/142 |
| 5,056,678 | 10/1991 | Grills | 220/259 |
| 5,501,607 | 3/1996 | Yoshioka et al. | 439/142 |

FOREIGN PATENT DOCUMENTS 4-124774  11/1992  Japan .
4-334908  11/1992  Japan .

Primary Examiner—Neil Abrams
Attorney, Agent, or Firm—Wenderoth, Lind & Ponack

[57] ABSTRACT

A structure of a vehicle charging connector includes a connector receptacle recessed in a body of a vehicle, a receptacle lid mounted on the receptacle to close and open an opening of the receptacle and having an opening open to the opening of the receptacle, the secondary connector including a connector lid closing and opening the opening thereof, and a butting member provided between an inner face of the receptacle lid and an outer face of the connector lid, the butting member butting against at least one of the receptacle lid and the connector lid when the receptacle lid is closed. When the receptacle lid is closed, the inside face of the receptacle causes the butting member to exert a force against the connector lid to ensure that the connector housing is closed by the connector lid.

2 Claims, 4 Drawing Sheets

VEHICLE CHARGING CONNECTOR AND A RECEPTACLE ENCLOSING THE CONNECTOR

BACKGROUND OF THE INVENTION

1. Field of the Invention

This invention relates to a structure of a vehicle charging connector applied to vehicles such as electric vehicles, a vehicle charging connector and a receptacle enclosing the vehicle charging connector.

2. Description of the Prior Art

FIG. 6 shows conventional structure of a vehicle charging connector. A connector receptacle 1 having an opening is provided in one side of a body of a vehicle as recessed inwardly of the body. A cylindrical connector housing 2 enclosing terminals (not shown) therein is mounted on a rear wall of the receptacle 1 so that an opening thereof is directed toward the opening of the receptacle 1. A connecting piece 3 protrudes from the side of the connector housing 2 obliquely upwardly, as viewed in FIG. 6. A waterproof connector lid 4 closing the opening of the connector housing 2 is pivotably mounted to the connecting piece 3. The connector lid 4 has a waterproofing packing on its inside outer periphery. A coil spring (not shown) is interposed between the connector lid 4 and the connecting piece 3 to urge the connector lid 4 in the direction in which the connector lid 4 is closed. The receptacle 1 has a receptacle lid 5 closing the opening thereof. A locking member 6 is provided between the receptacle lid 5 and the vehicle body for holding the receptacle lid 5 in its closed state.

When a power battery of the vehicle is to be charged, the locking member 6 is released and then, the receptacle lid 5 is opened. The connector lid 4 is opened against the urging force of the coil spring. Thereafter, a charger side connector is fitted into a vehicle side connector and then, charging is initiated. Upon completion of charging, the charger side connector is disengaged from the vehicle side connector and then the connector lid 4 is closed. The connector lid 4 is urged by the coil spring and closes the opening of the connector housing 2. The connector lid 4 is held in its closed state. The receptacle lid 5 is closed and engaged with the locking member 6 such that it is held in its closed state.

In the above-described structure, the sealing performance of the connector lid 4 is improved as the urging force of the coil spring becomes larger. However, a large force is required of an operator to open and close the connector lid 4. Accordingly, operating of the connector lid 4 becomes troublesome and there is a possibility that the operator may have his or her finger caught between the connector housing 2 and the connector lid 4. In view of this drawback the coil spring is conventionally set to a relatively small urging force. However, since the urging force of the coil spring is small the sealing performance of the waterproofing packing of the connector lid 4 is reduced. Consequently, water invades the interior of the connector housing 2 through a gap between the packing and the connector housing 2.

SUMMARY OF THE INVENTION

The present invention has been made in view of the foregoing and an object thereof is to provide structure of a vehicle charging connector which can provide improved operability and can prevent an invasion of water.

To achieve the object the present invention provides a structure of a vehicle charging connector comprising a connector receptacle recessed in a body of a vehicle a receptacle lid mounted on the receptacle to close and open an opening of the receptacle, a secondary connector mounted on a rear wall of the receptacle and having an opening facing the opening of the receptacle, the secondary connector including a connector lid closing and opening the opening thereof and a butting member provided between an inner face of the receptacle lid and an outer face of the connector lid the butting member butting against at least one of the receptacle lid and the connector lid when the receptacle lid is closed. The butting member may be mounted on the outer face of the connector lid, on the inner face of the receptacle lid or on the receptacle of the vehicle body.

According to the above-described construction, the butting member pushes the connector lid in the direction in which it closes when the receptacle lid is closed. Consequently, the opening of the secondary connector is completely closed by the connector lid. That is, the butting member pushes the connector lid upon closure of the receptacle lid, so that the connector lid completely closes the opening of the secondary connector. Accordingly, water can be prevented from invading the secondary connector when the receptacle lid is closed even in the condition that the connector lid incompletely closes the opening of the secondary connector.

In particular, when the butting member is mounted on the connector receptacle, it can be easily added to conventional connector receptacles.

Another object of the present invention is to provide a structure of a vehicle charging connector wherein a connector lid can be reliably closed.

To achieve the object, the butting member includes an elastic member facing a counterpart member against which the butting member butts. The elastic member contracts between the receptacle lid and the connector lid when the receptacle lid is closed. The elasticity acts so that both lids are forced away from each other. This elastic force can be adjusted by selecting an appropriate length of the elastic member. Consequently, the connector lid can be pressed against the opening by a predetermined force providing desired sealability. Thus, the sealability of the connector lid can be improved and the connector lid can be reliably closed.

Further, another object of the present invention is to provide an electrical connector which can provide improved operability and can prevent invasion of water when it is mounted on the vehicle body.

To achieve the object, the present invention provides an electrical connector comprising a connector housing enclosing terminals therein and having a cylindrical portion into which a counterpart connector is fitted, a connector lid provided for closing and opening an opening of the connector housing, and a butting member mounted on an outer face of the connector lid and which member can expand and contract.

According to the above-described connector, the butting member contracts between the receptacle lid and the connector lid when the connector is mounted in the connector receptacle with a receptacle lid mounted in the vehicle body and the receptacle lid is closed. The elasticity acts so that both lids are forced away from each other. Then, the connector lid is pressed against the opening edge of the connector housing. Consequently, the opening of the connector housing can be completely closed.

Further another object of the present invention is to provide a connector receptacle which can provide improved operability and can prevent invasion of water.

To achieve the object, the present invention provides a connector receptacle comprising a connector receptacle recessed in a body of a vehicle and having an opening open to the outside the vehicle, a receptacle lid provided on the receptacle to close and open the opening of the receptacle, the receptacle lid being held in a closed state by an engagement mechanism, and a butting member provided on an inner face of the receptacle lid and which butting member can expand and contract.

According to the above-described construction, the butting member contracts between the receptacle lid and the connector lid when a charging connector having a connector lid is enclosed in the receptacle and the receptacle lid is closed. The elasticity acts so that both lids are forced away from each other. Then, the connector lid is pressed against the opening edge of the connector housing. Consequently, the opening of the connector housing can be completely closed.

BRIEF DESCRIPTION OF THE DRAWINGS

Other objects, features and advantages of the present invention will become clear upon reviewing the following description of the preferred embodiment, made with reference to the accompanying drawings, in which.

DESCRIPTION OF THE PREFERRED EMBODIMENTS

Figure 1:
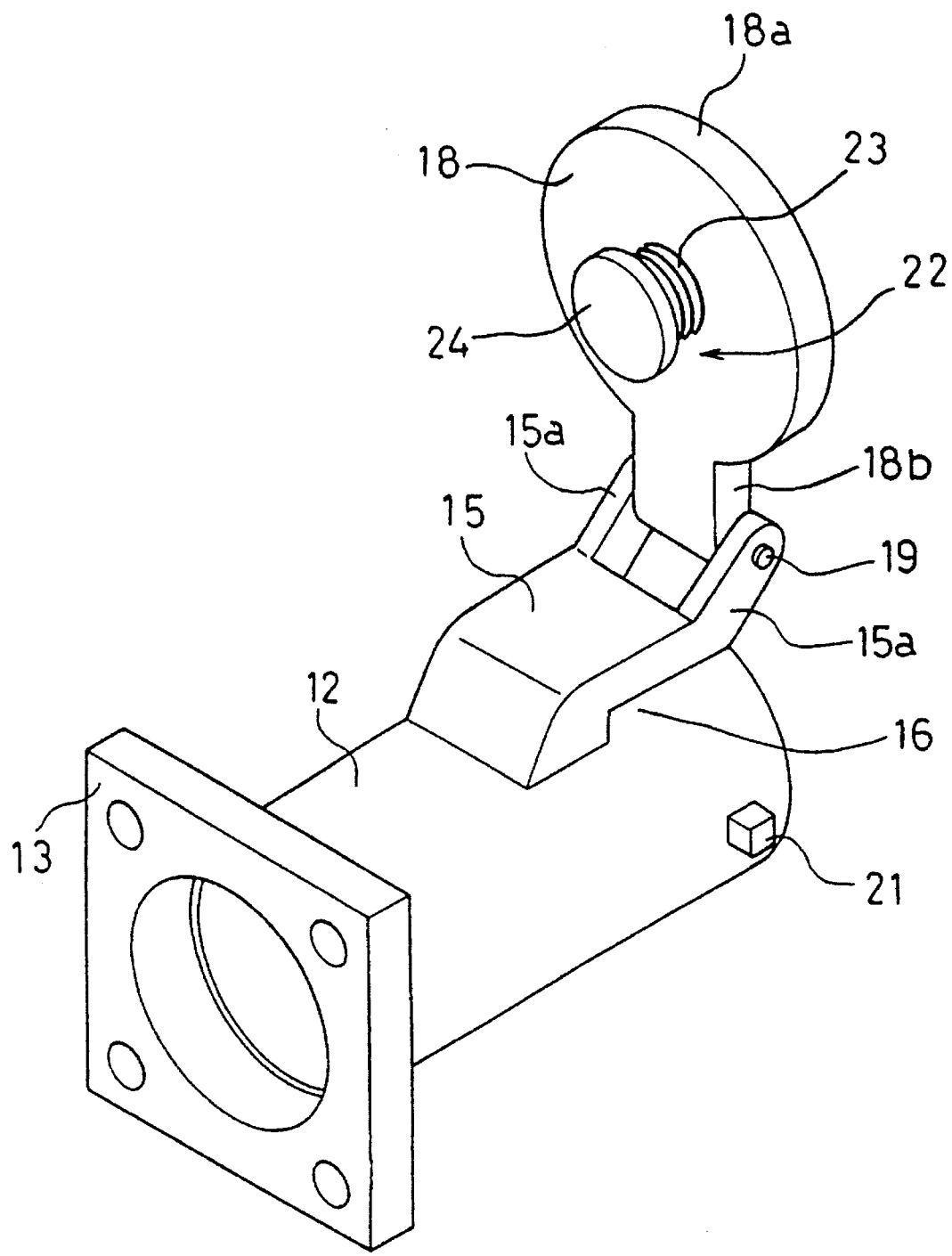
FIG. 1 is a perspective view of a first embodiment of structure of a vehicle charging connector in accordance with the present invention.
Figure 2:
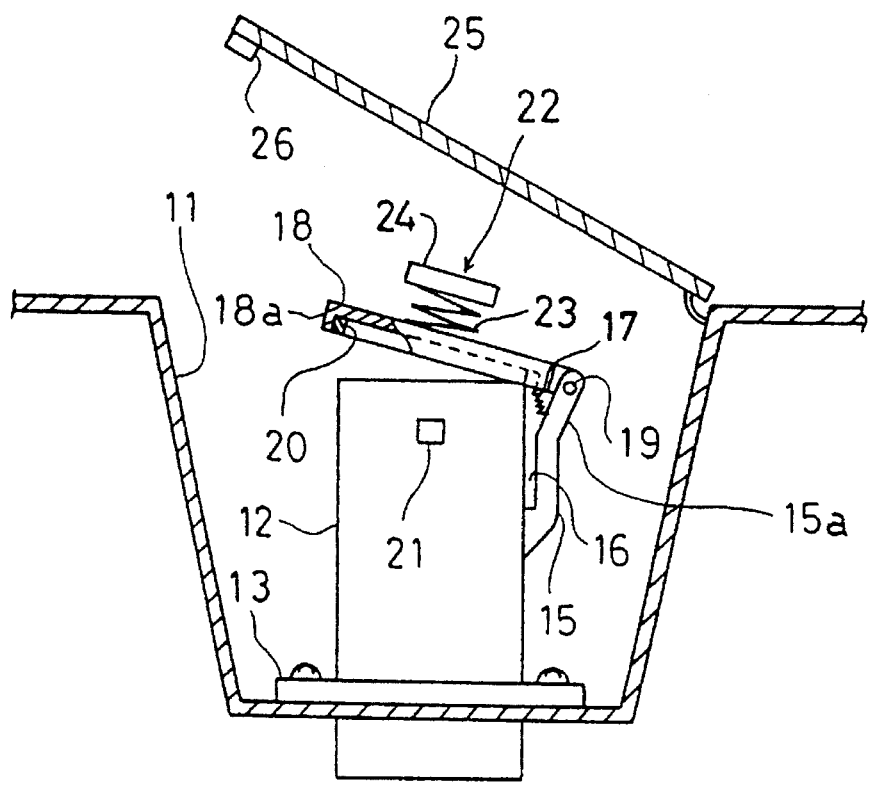
FIG. 2 is a longitudinal sectional view of the structure when a connector lid is incompletely closed.
Figure 3:
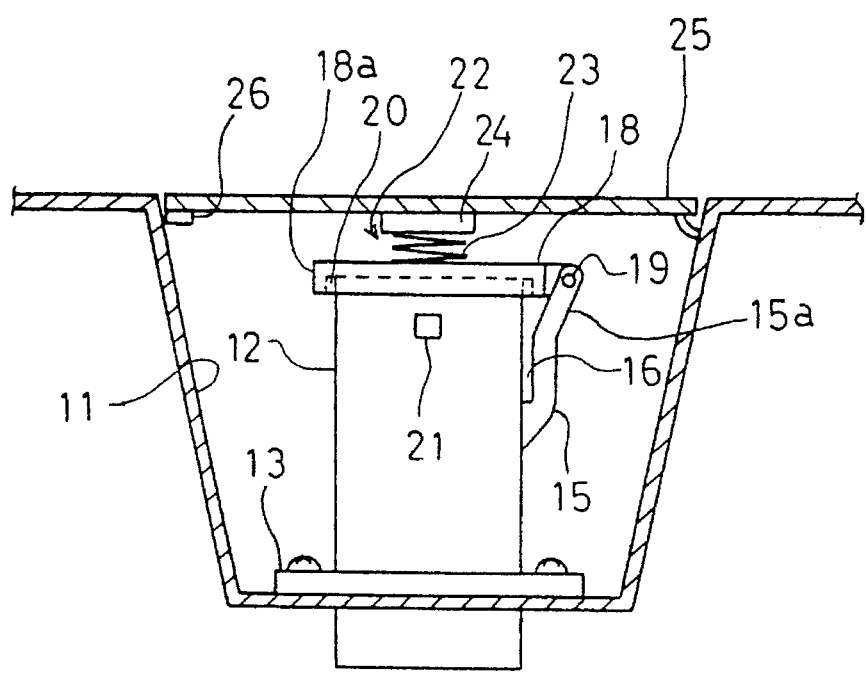
FIG. 3 is a longitudinal sectional view of the structure when a receptacle lid is closed.

A first embodiment of the present invention will be described with reference to FIGS. 1 to 3. A connector receptacle 11 is formed in an outer side face of a vehicle body as recessed inwardly of the body. A cylindrical connector housing 12 is mounted on a rear wall of the receptacle 11 . The connector housing 12 has an opening directed to an opening of the receptacle 11. The connector housing 12 includes a square flange 13 formed on the inner or rear outer periphery thereof. The flange 13 is fixed on the rear wall of the receptacle 11 by bolts so that the connector housing 12 is mounted on the receptacle rear wall. A plurality of terminals (not shown) are enclosed in the connector housing 12. The terminals are connected to a power source sect ion (not shown) mounted on the vehicle body.

A connecting member 15 is mounted on the outer periphery of the connector housing 12. The connecting member 15 has a space 16 between it and the outer periphery of the connector housing 12. A cylindrical primary connector housing (not shown) is inserted into the space 16. The connecting member 15 protrudes toward the opening of the connector housing 12 and has a generally inverted L-shaped section. The connecting member 15 has a pair of opposite connecting pieces 15a on its distal end. Each connecting piece 15a protrudes slightly obliquely toward the outer periphery of the connector housing 12 relative to the opening of the connector housing 12.

A circular connector lid 18 closing the opening of the connector housing 12 has an integral mounting portion 18b projecting from an outer peripheral edge thereof. The connector lid 18 is rotatably mounted on a hinge pin 19 further mounted on the connecting pieces 15a. The connector lid 18 has a peripheral wall 18a circularly projecting toward the connector housing 12. An elastic sealing member 20 is provided on the inside face of the peripheral wall 18a, as shown in FIGS. 2 and 3. The sealing member 20 abuts the peripheral edge defining the opening of the connector housing 12 when the connector lid 18 is closed. A coil spring 17 is provided between the connector lid 18 and the connecting piece 15a in a conventional manner for slightly urging the connector lid 18 in the direction in which it is closed. A convex portion 21 is provided on the outer periphery of the connector housing 12 near its opening. The convex portion 21 is engageable with an engaging member (not shown) formed on a primary connector.

A butting member 22 is mounted on an outer face of the connector lid 18. The butting member 22 projects perpendicularly to the connector lid 18. The butting member 22 comprises a pushing coil spring 23 and a pressing member 24 having a diameter slightly larger than the coil spring 23. One of two ends of the coil spring 23 is fixed to the connector lid 18. The coil spring 23 is slightly expansible and contractible longitudinally. The pressing member 24 is fixed to the other end of the coil spring 23. The length of the butting member 22 is so set that the distal end thereof protrudes from the opening of the receptacle 11 slightly outside the vehicle body when the opening of the connector housing 12 is closed by the connector lid 18. In the embodiment, the pushing spring 23 is an elastic expanding and contracting member.

A flat receptacle lid 25 closing the opening of the receptacle 11 is pivotatably mounted on the receptacle 11. pair of locking members 26 are mounted on the receptacle lid 25 and the vehicle body respectively. The receptacle lid 25 is held in its closed state by the locking members 26 engaged with each other.

The operation of the structure will be described. In when a power battery of the vehicle is to be charged, the locking members 26 are disengaged from each other and the receptacle lid 25 is opened. The connector lid 18 is then opened against the urging force of the coil spring. The primary connector is fitted into the connector housing 12 when the connector lid 18 is open. Then, the engaging member of the primary connector is engaged with the convex member of the connector housing 12 so that the terminals in the connector housing and those of the primary connector are mated. Since the urging force of the coil spring is not so large, the connector lid 18 can be easily opened and there is no possibility that the operator has his or her finger caught between the connector lid 18 and the connector housing 12.

Upon completion of charging, the primary connector is unmated from the secondary connector, whereupon the coil spring forces the connector lid 18 to pivot such that the opening of the connector housing 12 is closed by the connector lid 18. If the connector housing 18 is not completely closed by the connector lid 18, the inner surface of the receptacle lid 25 will abut the pressing member 24 as it is pivoted towards its closed position. When the receptacle lid 25 is closed in this state, the connector lid 18 is pushed by the pushing member 24, thereby being pivoted in the direction in which it closes the opening of the connector housing 12. The sealing member 20 is pressed against the edge of the connector housing 12, and is deformed against the edge, whereby the opening of the connector housing 12 is completely closed by the connector lid 18. Since a restoring force of the contracted coil spring 23 presses the sealing member 20, it can be prevented from being excessively squeezed. Consequently, the sealability is great.

Subsequently, when the receptacle lid 25 is held in its closed state by the locking members 26, the connector lid 18 is held in its closed state. Accordingly, since the connector lid 18 is not opened as long as the receptacle lid 25 is closed, invasion of the water into the connector housing 12 can be prevented.

Figure 4:
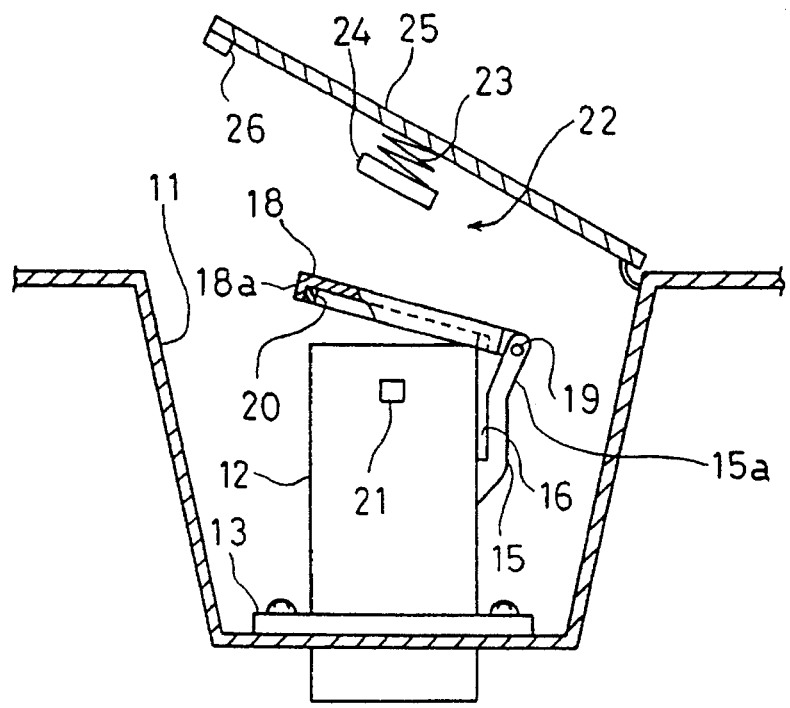
FIG. 4 is a perspective view of another embodiment of the structure of the vehicle charging connector in accordance with the present invention.
Figure 5:
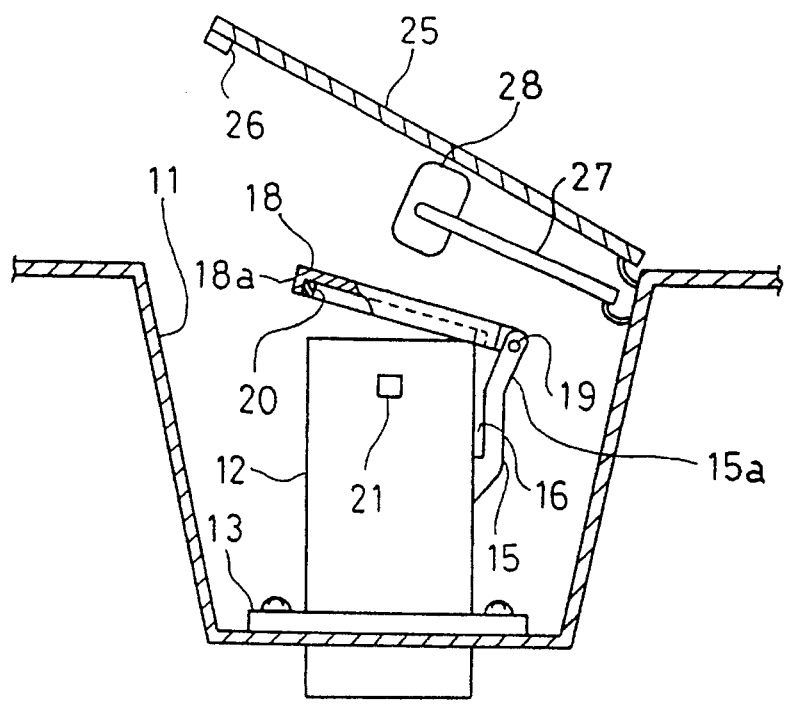
FIG. 5 is a perspective view of still another embodiment of the structure of the vehicle in accordance with the present invention.
Figure 6:
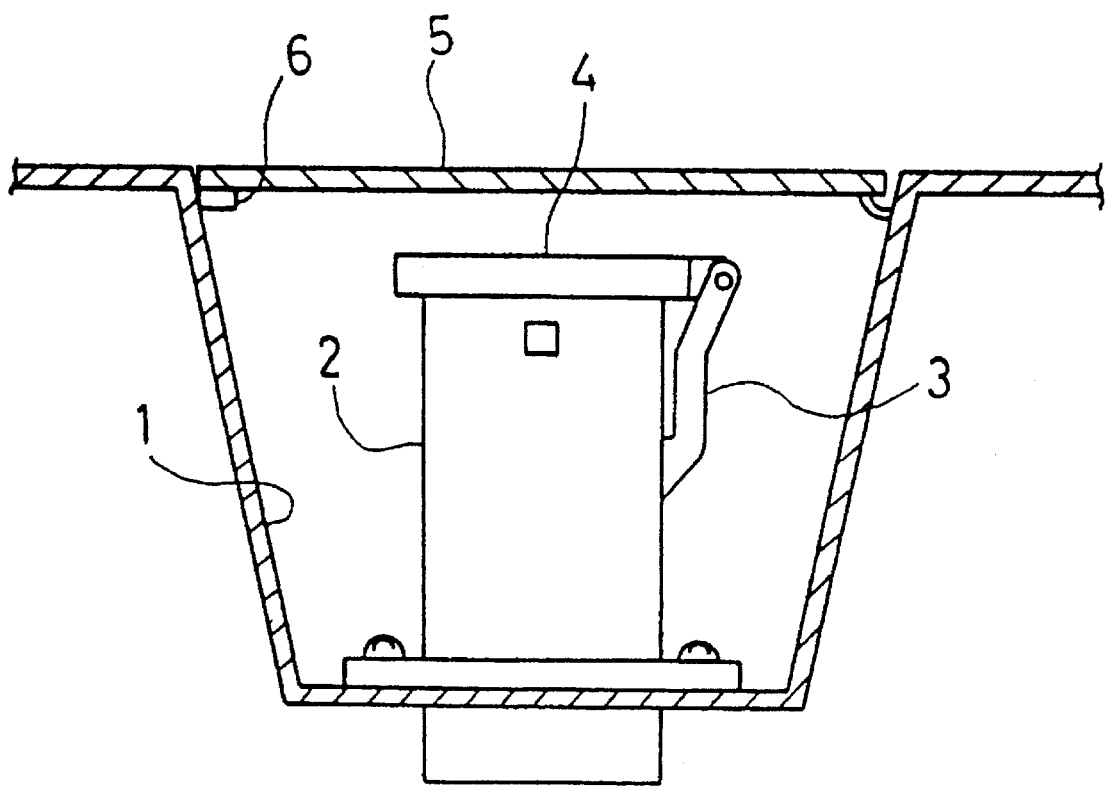
FIG. 6 is a longitudinal sectional view of conventional structure of the vehicle charging connector.

Although the butting member 22 is mounted on the outer face of the connector lid 18 in the foregoing embodiment, one end of the pushing coil spring 23 may be fixed to the inside face of the receptacle lid 25 and the other end thereof may be fixed to the pushing member 24, as shown as another embodiment of the invention in FIG. 4. Furthermore, in another embodiment shown in FIG. 5, a rotatable support member (or butting member) 27 is mounted on the inside of the receptacle 11 and an elastic pushing member 28 may be mounted on the distal end of the support member 27. The support member 27 causes the pushing member 28 to be caught between the receptacle lid 25 and the connector lid 18 when the receptacle lid 25 is closed. In this case, as the pushing member 28 is slightly squeezed, the connector lid 18 is pressed against the edge of the connector housing 12 by the receptacle lid 25.

As is obvious from the foregoing description, the elastic expanding and contracting member can comprise a coil spring, rubber or leaf spring. When the leaf spring is employed, particularly, a curved end thereof is held on the connector lid or the receptacle lid and its other end protrudes toward either counterpart member, the connector lid or the receptacle lid.

The butting member may be formed by bending the connector lid in the direction of the receptacle lid or by bending the receptacle lid in the direction of the connector lid.

The foregoing disclosure and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A charging connector structure for charging the battery of a vehicle, said structure comprising:

a connector receptacle recessed in a body of the vehicle, said connector receptacle having an opening and a rear wall remote from said opening;

a receptacle lid mounted to said receptacle so as to be movable between positions at which the lid covers said opening and exposes said opening, respectively, so as to close and open said receptacle;

a connector housing mounted to the rear wall of said connector receptacle, said connector housing having an opening facing the opening of said connector receptacle;

a connector lid spring-biased towards a position at which the connector lid covers the opening of said connector housing so as to normally close said connector housing, said receptacle lid being movable between the positions thereof independently of the movement of said connector lid whereby one must first move the receptacle lid to the position thereof that exposes the opening of the connector receptacle and then move the connector lid off of the opening of said connector housing in order to gain access to the interior of said connector housing; and a butting member longitudinally interposed between an inner surface of said receptacle lid and an outer surface of said connector lid, said butting member having a length greater than the distance measured between said inner and said outer surfaces of said lids when said receptacle lid is in the position thereof covering the receptacle opening and said connector lid is in the spring-biased position thereof such that said butting member is caused by said receptacle lid, when said receptacle lid covers said receptacle opening, to exert a force against said connector lid that forces said connector lid in the same direction that said connector lid is spring-biased thereby ensuring that said connector lid seals said opening of the connector housing, said butting member being out of concurrent engagement with said lids when said receptacle lid is in said position thereof at which the connector receptacle is opened, whereby only the force of the spring-biased connector lid need be overcome to open the connector lid;

wherein said butting member is mounted to said connector receptacle.

2. The structure according to claim 1, wherein said butting member includes a resilient member which becomes compressed between said lids when said receptacle lid is in the position thereof that covers the receptacle opening and said connector lid is in the spring-biased position thereof.

\* \* \* \* \*